(No Model.)  3 Sheets—Sheet 2.
E. K. ADAMS.
WATTMETER.
No. 595,751. Patented Dec. 21, 1897.
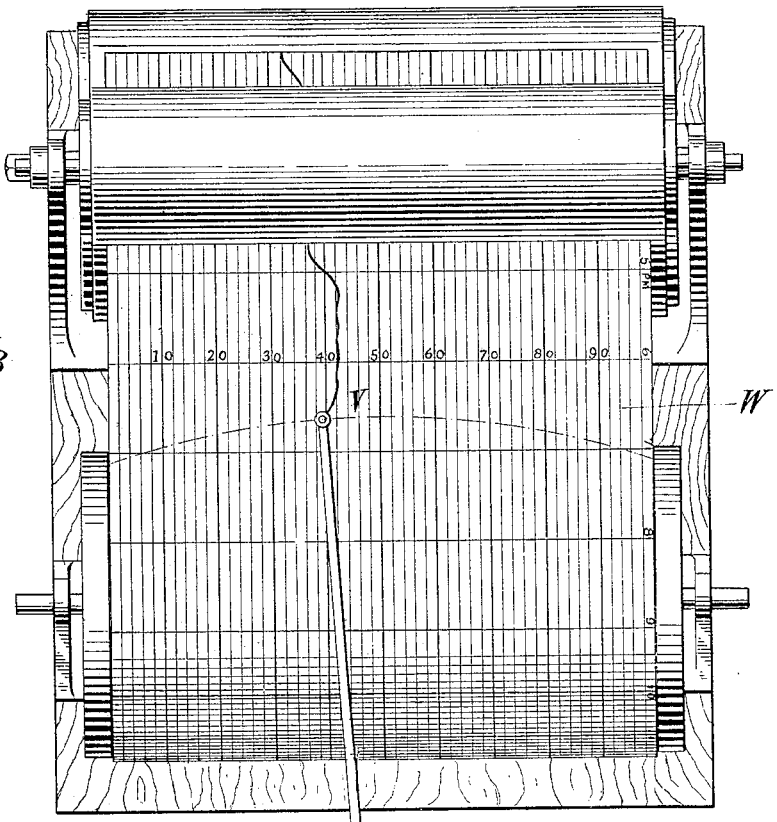
*Fig. 3*
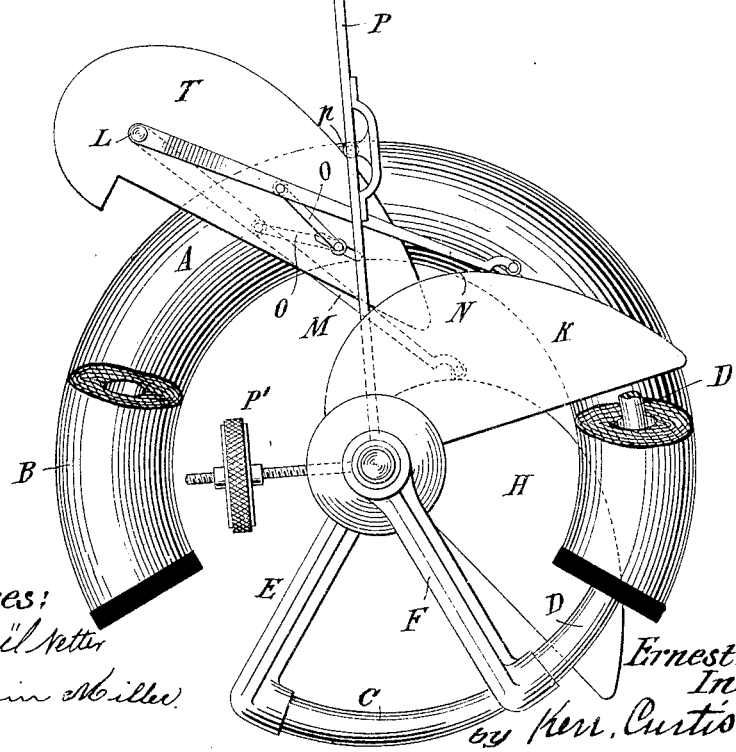
Witnesses:
Raphaël Netter
Benjamin Miller
Ernest K. Adams,
Inventor
by Kerr, Curtis & Page Attys (No Model.)  3 Sheets—Sheet 3.
E. K. ADAMS.
WATTMETER.
No. 595,751.  Patented Dec. 21, 1897.
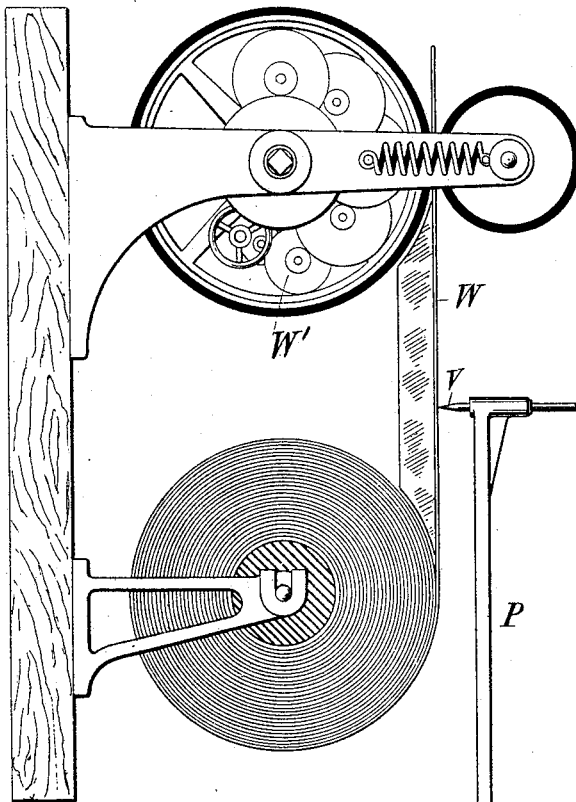
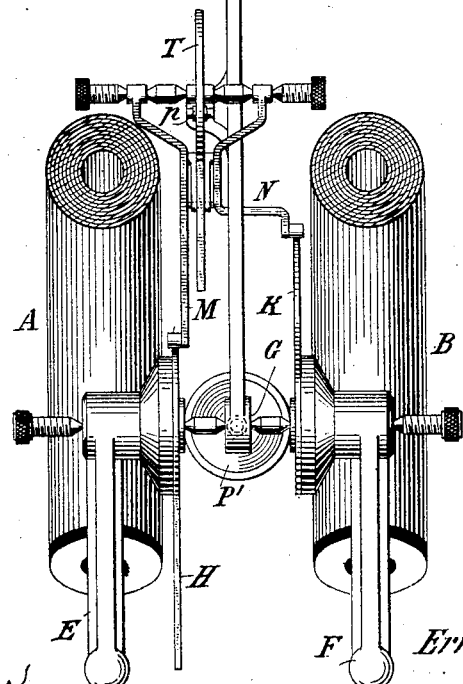
Fig. 4
Witnesses:
Raphaël Netter
Benjamin Miller
Ernest K. Adams,
Inventor
by Kerr, Curtis & Page Att'ys.

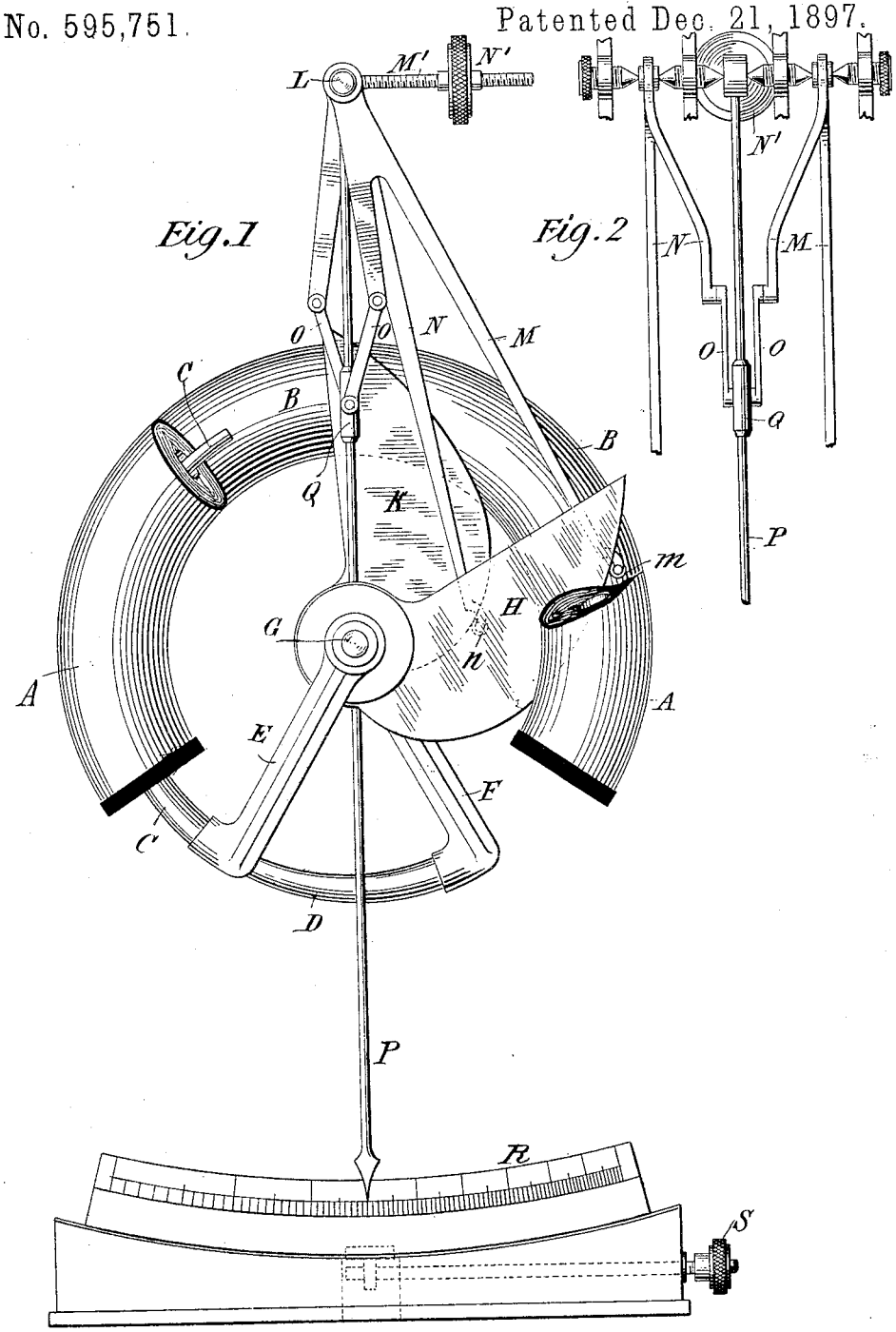

UNITED STATES PATENT OFFICE.

ERNEST K. ADAMS, OF NEW YORK, N. Y.

WATTMETER.

SPECIFICATION forming part of Letters Patent No. 595,751, dated December 21, 1897.

Application filed September 11, 1897. Serial No. 651,266. (No model.)

*To all whom it may concern:*

Be it known that I, ERNEST K. ADAMS, a citizen of the United States, residing at New York, in the county and State of New York, have invented certain new and useful Improvements in Wattmeters, of which the following is a specification, reference being had to the drawings accompanying and forming a part of the same.

The object of the invention which forms the subject of my present application is to provide a direct-reading wattmeter—that is to say, an instrument which will indicate directly on a scale the number of units of electrical activity or power passing at any given instant in an electric circuit, or will record the same so that the total expenditure of energy in work for a given period of time may be directly and readily ascertained. The apparatus or instrument which I have devised for this purpose is one dependent in principle of operation upon the law that the sum of the logarithms of any two numbers is the logarithm of the product of these numbers, and the manner in which this principle is or may be applied will be understood from the following general considerations.

The electrical unit of power, known as the "watt," is the rate of working in a circuit when the electromotive force is one volt and the current one ampere, and hence the number of watts in a circuit at any given time is found by multiplying the volts by the amperes or by adding the logarithm corresponding to the number of volts to that corresponding to the number of amperes and finding the number of which the logarithm is this sum.

I have devised an instrument the essentially novel principle of which is that it performs this addition mechanically. In other words, the instrument contains two movable elements which assume positions, the one corresponding to the volts, the other to the amperes, and the movements of these elements are transmitted through logarithmic cams to a pointer or equivalent device in such manner that the relative position of the latter will always correspond to the sum of the logarithms of the volts and amperes, respectively, or, as above explained, will represent the logarithm of the watts in the circuit at the time. The construction of an instrument operating on this principle may obviously be varied to a very wide extent; but in the following description I shall refer only to the best and most practicable form of instrument which I have devised and which I believe to be typical of those embodying the principle.

In the drawings hereto annexed, Figure 1 is a view in elevation and part section of an indicating-wattmeter constructed in accordance with my invention. Fig. 2 is a side view of a portion of the same. Fig. 3 is a view in elevation of a recording-wattmeter constructed on the same principle, and Fig. 4 is a side view and part section of the same.

The instrument comprises two elements which respond to variations in the electromotive force and current, respectively, in a circuit. These are preferably solenoids A B, with movable cores C D, the solenoids being of generally circular conformation and of about two hundred and forty degrees extent. One of these solenoids, as A, is that which is to be connected in series with the circuit to be measured, while the other is in a shunt to the same circuit or in parallel therewith, so that the core of the first will be acted upon in proportion to the amperes and that of the second in proportion to the volts.

The cores C D are secured to radial arms E F, turning about a shaft or pivotal center G and carrying cams H K, respectively fixed to said arms.

Delicately pivoted to oscillate about a center L are two elbow-levers M N, having antifriction-rollers $m$ $n$ at the extremities of their longer arms, which bear and run upon the edges of the cams H K. The shorter arms of said levers are connected by links O with a sleeve Q, sliding freely on a long pointer P, mounted to turn about the center L.

The links O maintain the pointer P always equidistant from the short arms of levers M N, and if the pointer were of the same length as the longer arms of the levers M N they would move its end exactly one-half the sum of the distances moved through by the ends of said arms; but by making the pointer of double this length its end will move exactly the sum of the distances on the circular arc produced by the cams.

The cams H K are cut to conform to curves representing the logarithms of the values of the positions assumed by the cores C D in accordance with the variations in the electromotive force and current, so that the positions of the pointer P will correspond to the sum of the logarithms of the volts and amperes, and by providing a suitable scale R, graduated according to the numbers represented by the added logarithms, the number of watts passing may be directly read from the instrument.

An arm M', with an adjustable counterweight N', serves to retract the pointer and to maintain the rollers m n in contact with the cams.

A tangent-screw S permits the scale R to be shifted for the purpose of adjusting the true zero-point to the position of the pointer.

As the movements of the pointer P are not proportional to the increments of the energy which it indicates, it could not be readily employed in the form described as a recording instrument, for the reason that a planimeter by means of which the area of a curve, and thereby the total watt-hours, is ascertained requires equal units. In order to provide a recording-wattmeter, therefore, I have devised the apparatus shown in Figs. 3 and 4.

In this instrument the pointer, which carries a pen or marker, is caused to move through angles proportionate to the increments of power, so that the watt-hours may be ascertained by running a planimeter over the plotting-paper on which the record is traced. This is accomplished by using in the place of the pointer P a third cam T, pivoted at the point L, and causing it to be moved through logarithmic angles corresponding to the sum of the logarithms of the volts and amperes, respectively.

The pointer P is pivoted at G and is provided with a counterweight P', which keeps a roller p, carried by the pointer, in constant contact with the edge of the cam T. The pointer or arm P carries a pen or marker V, which bears upon a band of plotting-paper W, moved at a given rate by clockwork W'.

The curve of the cam T may be readily ascertained. Known amperes and volts, and therefore watts, are sent through the coils of the instrument and the pointer turned to the position in which its end points to the number of watts on the paper. A point is made on the disk T where the roller p is, and so in like manner the points of the curve for other known numbers of watts may be laid out and the cam cut to the proper curve. In this way the circular error on the paper is avoided.

What I claim is—

1. The combination in a wattmeter of a device capable of movements corresponding to the amperes, and a device capable of movements corresponding to the volts of the current in a circuit to be measured, means for converting these movements into displacements corresponding in extent to the logarithms of the numbers of the amperes and volts, respectively, which produce them, and a pointer or arm moved thereby through angles proportionate to the sum of such displacements, as set forth.

2. The combination in a wattmeter of a series solenoid, a shunt-solenoid and cores therefor which are displaced according to the amperes and volts respectively, in the circuit with which the solenoids may be connected, means for converting the movements of said cores into displacements corresponding in extent to the logarithms of the numbers of amperes and volts respectively which produce them, and an arm or pointer moved thereby through angles proportionate to the sum of such displacements, as set forth.

3. The combination in a wattmeter of a series solenoid, a shunt-solenoid and cores therefor which are displaced according to the amperes and volts, respectively, in the circuit with which the solenoids may be connected, logarithmic cams moved by said cores, an arm and levers operated by said cams and connected with the arm in such manner as to move the same through angles proportionate to the sum of the displacements effected by said cams, as set forth.

4. The combination in a wattmeter of a series solenoid, a shunt-solenoid and cores therefor, which are displaced according to the amperes and volts respectively in the circuit with which the solenoids may be connected, logarithmic cams moved by said cores, levers bearing on the cams, an arm and links between the levers and said arm and having a sliding connection with the latter, whereby the angular movement of the arm will be proportional to the sum of the displacements of the two levers, as set forth.

5. The combination in a wattmeter with an arm capable of displacements proportional to the logarithms of the number of watts in the circuit to be measured, an index or marker, and means for converting the displacements of the said arm into displacements of the index or pointer proportionate to the number of watts, as set forth.

6. The combination in a wattmeter of a series solenoid, a shunt-solenoid, and cores therefor which are displaced according to the amperes and volts respectively in the circuit with which the solenoids may be connected, logarithmic cams moved by the said cores, an arm and a system of levers intermediate thereto and said cams, by means of which the said arm is moved through angles proportionate to the sum of the displacements effected by the cams, an index or marker moved by the arm which is formed as a cam with a curve of such character that the displacements of the index or marker will be proportionate to the number of watts.

ERNEST K. ADAMS.

Witnesses:
M. LAWSON DYER,
G. W. MARTTING.